March 8, 1932. F. K. RANDOLPH 1,848,081
AUTO OXIDATIVE PROCESS OF RECOVERING IODINE FROM BRINES
Filed April 7, 1930
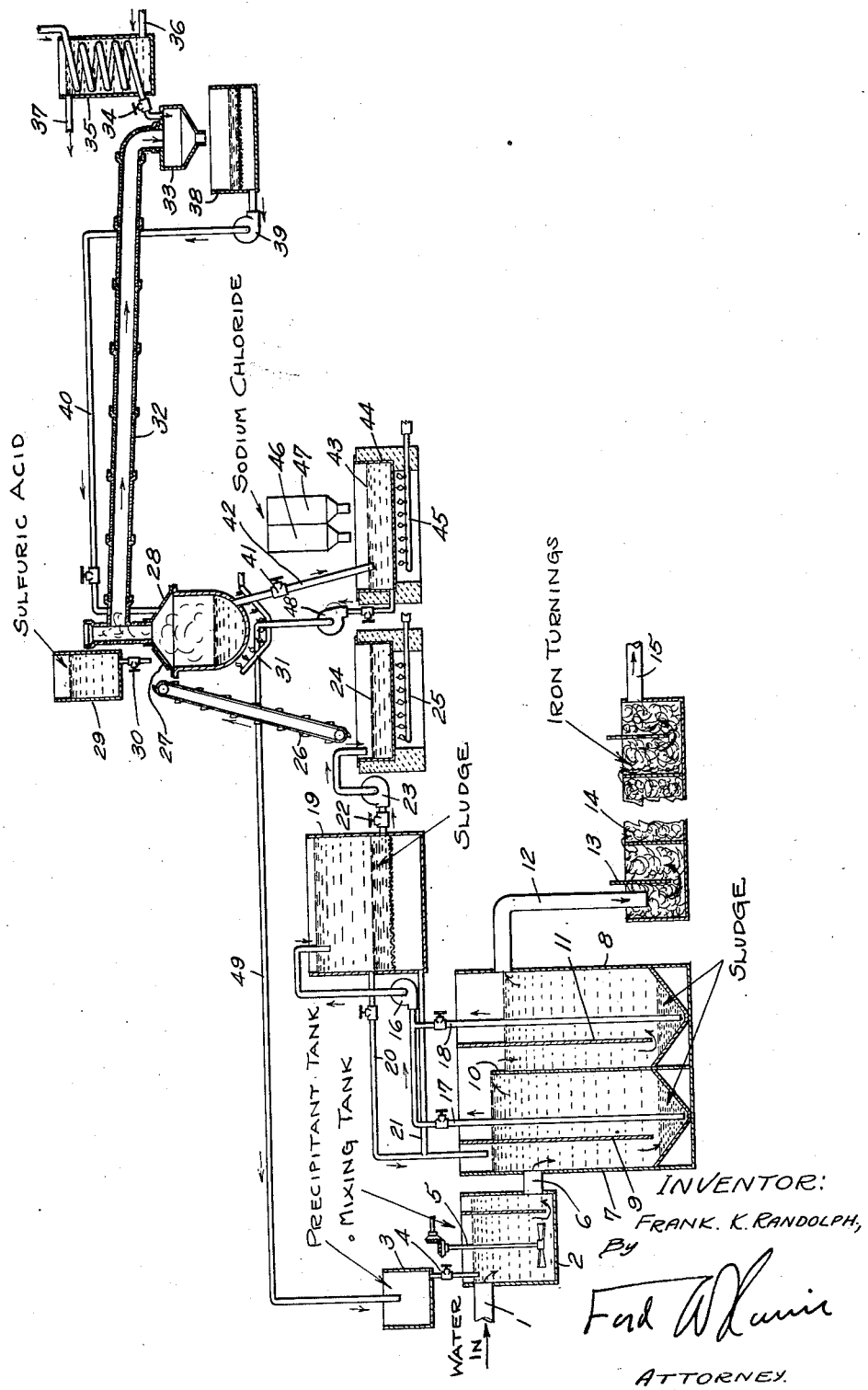
INVENTOR:
FRANK. K. RANDOLPH,
By
ATTORNEY.

UNITED STATES PATENT OFFICE

FRANK K. RANDOLPH, OF LOS ANGELES, CALIFORNIA, ASSIGNOR TO GENERAL SALT COMPANY, OF LOS ANGELES, CALIFORNIA, A CORPORATION OF CALIFORNIA

AUTO-OXIDATIVE PROCESS OF RECOVERING IODINE FROM BRINES

Application filed April 7, 1930. Serial No. 442,366.

This invention has for its object the selective recovery of iodine from brines of subterranean origin, particularly those occurring in oil wells. The process is not confined to oil-well brines, however, since it may equally well be applied to any water containing any important quantity of alkali-forming metal iodide, especially if comparatively large quantities of calcium and magnesium bicarbonates, or other alkali-earth metal bicarbonates are also present in the water.

A further object of the invention is to provide and use a combined iodine-capturing and oxidizing agent, the exact nature of which will be later described, and, further, to provide a process for efficiently regenerating such agent and so providing a cyclic process for the use of such agent.

Briefly stated, my process is based upon the discovery that the iodide and bicarbonate constituents of the natural brines of the kind described will react with a mixture of cuprous chloride and ferrous chloride in such a way that the iodine is precipitated as cuprous iodide in association with ferrous hydroxide:

(I) $2NaI + Ca(HCO_3)_2 + Mg(HCO_3)_2 + (Cu_2Cl_2 + 2FeCl_2) = (Cu_2I_2 + 2Fe(OH)_2) + CaCl_2 + MgCl_2 + 4CO_2 + 2NaCl$

It is the ferrous hydroxide in the precipitate composed of cuprous iodide and ferrous hydroxide, which will later, after oxidation to the ferric condition, act as an oxidizing agent.

Excess copper from the cuprous chloride is precipitated according to the equation:

(II) $(Cu_2Cl_2 + 2FeCl_2) + Fe = 2Cu + 3FeCl_2$

The precipitate from reaction (I) is oxidized by the combined action of moisture, heat and air as follows:

(III) 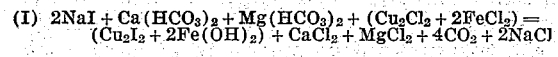
$(Cu_2I_2 + 2Fe(OH)_2) + \text{moisture} + \text{heat and air} = Cu_2I_2 + 2Fe(OH)_3$ The oxidized product of reaction (III) is now treated with dilute sulfuric acid for the purpose of separating the iodine. It is in this step that the oxidative effect of the ferric hydroxide in the precipitate is realized, since otherwise, if it did not occur, hydriodic acid would be produced instead of free iodine. The equation is:

(IV) 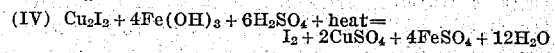
$Cu_2I_2 + 4Fe(OH)_3 + 6H_2SO_4 + \text{heat} = I_2 + 2CuSO_4 + 4FeSO_4 + 12H_2O$ The regeneration of the combined iodine-capturing and oxidizing agent is easily accomplished by means of ordinary salt and copper as the following equation shows:

(V) 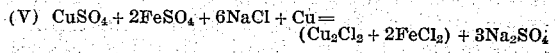
$CuSO_4 + 2FeSO_4 + 6NaCl + Cu = (Cu_2Cl_2 + 2FeCl_2) + 3Na_2SO_4$ From the above outline, it will be evident that a very economical process has been provided, since the only raw materials necessary are brine, salt, iron, copper and sulfuric acid, all of which are cheap. The iodine produced is in a substantially pure state.

The natural brine which I prefer to use in my process and which fulfills all the requirements thereof is one obtained from oil wells, either active or abandoned, in the vicinity of Long Beach, California. A typical analysis of this water as expressed in parts per million is:

| | Parts per million |
|---|---|
| Silica $SiO_2$ | 22 |
| Iron oxide $Fe_2O_3$ | 15 |
| Aluminum oxide $Al_2O_3$ | 13 |
| Calcium oxide $CaO$ | 414 |
| Magnesium oxide $MgO$ | 266 |
| Sodium oxide $Na_2O$ | 5080 |
| Potassium oxide $K_2O$ | 1150 |
| Barium oxide $BaO$ | 46 |
| Carbonic acid $H_2CO_3$ | 196 |
| Chlorine $Cl_2$ | 10650 |
| Bromine $Br_2$ | 45 |
| Iodine $I_2$ | 30 |
| Organic matter | 100 |

There are also present in this water crude petroleum, dissolved naphthionic acids, "rotary mud" from drilling operations and other colloidal clays of complex composition.

In previous attempts to work this water for iodine the following steps were performed:
1—Acidifying the water.
2—Oxidizing the soluble iodide to elemental iodine.
3—Absorbing the elemental iodine in an appropriate adsorbent.
4—Separating the adsorbed iodine and forming an alkali metal iodide therewith.
5—Precipitating or distilling the crude iodine from a concentrated soluble iodide.

It will be seen, therefore, that in my process expensive acidification of large quantities of water and the use of expensive adsorbents are avoided.

The accompanying drawing illustrates more or less diagrammatically an elevational view of an apparatus which I prefer to use to carry out my process. Other apparatus may be substituted, but that shown allows the process to take place in a continuous manner, which is deemed essential to commercial success.

In the drawing 1 is an inlet pipe for oil-well brine, this pipe delivering to a mixing tank 2 above which is a tank 3 from which the combined precipitant and oxidizing agent may be delivered to the tank by a gravity discharge pipe in which there is a valve 4. An agitator 5 is provided in the tank 2. A pipe 6 connects tank 2 and a deep settling tank 7, immediately adjacent which is another settling tank 8 separated from tank 7 by a baffle wall 10. Tanks 7 and 8 possess conical bottoms and deep baffles 9 and 11 respectively, which extend nearly but not quite to their bottoms. The baffles are located opposite and near the tank inlets and their function is to direct the inflow and minimize disturbance. An outlet pipe 12 connects the upper part of tank 8 with a maze-box 13 containing iron or steel turnings 14, the function of which is to precipitate copper contained in the effluent water. An overflow pipe 15 from the upper part of maze-box 13 is provided to lead the overflow of this box to waste.

On a level above the tops of tanks 7 and 8 is located the remainder of the apparatus, a sludge storage and filter tank 19 of which is in communication with tanks 7 and 8. Two pipes 17 and 18 extend from the bottoms of tanks 7 and 8 respectively to a pump 16 which is arranged to discharge into tank 19. The latter is also provided with two gravity discharge pipes 20 and 21, the first extending from above the usual sludge level and the second from the filtrate compartment. These extend to tank 7 and are for the purpose of returning excess water from tank 19 to the precipitation tanks.

From the region of the sludge level in tank 19 there extends a discharge pipe 22 in which there is a pump 23, the discharge of the pump extending into a heatable pan 24 under which there is a burner 25.

On a still higher level is located the iodine-subliming apparatus. This comprises a still or retort 28 heated from below by a burner 31. A charging opening 27 is provided through which oxidized precipitate may be delivered from a conveyor 26 extending to pan 24, and sulfuric acid may be delivered from a tank 29 and valved pipe 30. A bottom discharge pipe 42 in which there is a valve 41 connects the bottom of the retort 28 with a second heatable pan 44 under which there is a burner 45. This pan is intended for the regeneration of the iodine-capturing and oxidizing agent. Above the pan, two salt reservoirs 46 and 47 are mounted. A pipe 49 in which there is a pump 48 extends from the interior of pan 44 through the region of the retort burner flame to the precipitant storage tank 3.

From the top of retort 28 a stoneware conduit 32 extends, this terminating in a hopper 33 located above a filter box 38. From the top of hopper 33 there extends a spiral condensing pipe 35 contained in a water jacket supplied with cool water through an inlet 36. An outlet is provided at 37. From the bottom of filter 38 extends a discharge pipe 40 in which there is a pump 39, the pipe being so arranged that water or acid from the filter may be returned to the retort 28.

The operation of the process in the above described apparatus is as follows:

Brine flows continuously into the mixing tank 2 from pipe 1, while precipitant also flows from tank 3 at a rate just sufficient to react with all of the iodine. The brine and precipitant are thoroughly mixed by agitator 5 after which the contents of tank 2 flow into tank 7 for settling. The flow is turned by baffle 9 into the bottom of tank 7, whereupon considerable deposition of cuprous iodide and ferrous hydroxide takes place according to Equation (I). Most of the solid matter remaining in suspension is removed by settling in tank 8, through which the water next flows. When it finally flows out over the iron turnings in the maze-box 13, it deposits whatever copper it carries on the iron, from which the copper may easily be recovered and re-used in the process. The water then flows to waste through pipe 15.

After a suitable period of operation, when considerable sludge or precipitate has collected in the conical bottoms of tanks 7 and 8, pump 16 is operated and the sludge transferred to storage and filter tank 19, the excess water being allowed to return to tank 7 through pipes 20 and 21. When the sludge has reached a suitable consistency in tank 19, that is, of a fairly fluid paste, it is pumped by means of pump 23 to pan 24. There it is heated with access of air while still moist until it is dry and the ferrous hydroxide therein fully oxidized to ferric hydroxide according to Equation (III). It is then transferred by conveyor 26 to retort 28.

Sulfuric acid from tank 29 is now added in proper quantity to the oxidized sludge in the retort and the temperature is raised gradually to a point at which elemental iodine sublimes. The iodine vapors traverse the earthenware pipe 32, gradually solidifying to scales therein, these scales being carried into hopper 33. Vapors still remaining uncondensed in that hopper rise through water cooled condenser 34 at the cooler temperature of which additional condensation takes place. All condensed products drop into filter box 38, in which the solid one (iodine) is separated from the liquids (water or dilute acid). The liquids are returned usually to the retort 28 by means of pump 39 and pipe 40.

The sublimation of iodine instead of hydriodic acid from the retort is due entirely to the oxidizing action of the ferric hydroxide which acts according to Equation (IV). After this reaction is complete, the spent contents of the retort are discharged by gravity through pipe 42 into pan 44 where sufficient salt and finely divided copper are added to satisfy Equation (V). The mass is then gently heated in the presence of water until the reagents present are entirely reduced to the ———ous condition. The still wet mass is then pumped by means of pump 48 and pipe 49, back to the precipitant storage tank 3.

It is evident that skilled chemists can make considerable changes in this process without departing from the spirit of the invention. All such changes are to be regarded as lying within the scope of my invention.

I claim as my invention:

1. The process of recovering iodine from brines which contain it in combination with alkali-forming metals and which also contain alkali-earth metal bicarbonates, which comprises precipitating the iodine, together with ferrous hydroxide by the addition of a mixture of cuprous chloride and ferrous chloride, separating the precipitate containing cuprous iodide and ferrous hydroxide from the bulk of the water, heating said precipitate in the presence of oxygen sufficiently to cause the oxidation of the iron compound present to the ferric condition, and then treating the oxidized iron compound and the cuprous iodide with sulphuric acid at sufficiently high temperature to separate and volatilize elemental iodine.

2. The process of recovering iodine from brines containing it and alkali metal bicarbonates, which comprises precipitating the iodine with a mixture of cuprous chloride and ferrous chloride, oxidizing the mixed precipitate containing cuprous iodide and ferrous hydroxide, decomposing the precipitate with sulfuric acid, recevering the so produced elemental iodine, and regenerating the mixed iodine-precipitating agent into its original cuprous chloride and ferrous chloride by heating the residue of the acid decomposition with sodium chloride and copper in the presence of water until reduction is substantially complete.

3. The process of recovering iodine from brines which contain alkali-metal iodides and alkali-earth metal bicarbonates, which comprises continuously dosing a stream of the said brine with a reagent comprising cuprous chloride and ferrous chloride, allowing the resulting precipitate to settle, periodically collecting the precipitate, oxidizing the precipitate containing cuprous iodide and ferrous hydroxide by heating in the presence of air and moisture, decomposing the oxidized precipitate with sulfuric acid in the presence of heat whereby to separate elemental iodine, and then condensing and collecting the iodine.

4. A process according to claim 3 having the additional steps of treating the residue from the separation of the iodine with sufficient sodium chloride and copper in the presence of heat and moisture to produce mixed cuprous chloride and ferrous chloride from the said residue, and then using the said mixed products to precipitate more iodine.

In testimony whereof, I have hereunto set my hand at Los Angeles, California, this 2nd day of April, 1930.

FRANK K. RANDOLPH.